US011335333B2

(12) United States Patent
Han et al.

(10) Patent No.: US 11,335,333 B2
(45) Date of Patent: May 17, 2022

(54) SPEECH RECOGNITION WITH SEQUENCE-TO-SEQUENCE MODELS

(71) Applicant: Google LLC, Mountain View, CA (US)

(72) Inventors: Wei Han, Mountain View, CA (US); Chung-Cheng Chiu, Sunnyvale, CA (US); Yu Zhang, Mountain View, CA (US); Yonghui Wu, Fremont, CA (US); Patrick Nguyen, Mountain View, CA (US); Sergey Kishchenko, Mountain View, CA (US)

(73) Assignee: Google LLC, Mountain View, CA (US)

( * ) Notice: Subject to any disclaimer, the term of this patent is extended or adjusted under 35 U.S.C. 154(b) by 335 days.

(21) Appl. No.: 16/717,746

(22) Filed: Dec. 17, 2019

(65) Prior Publication Data
US 2020/0126538 A1 Apr. 23, 2020

Related U.S. Application Data

(63) Continuation-in-part of application No. 16/516,390, filed on Jul. 19, 2019, now Pat. No. 11,145,293.
(Continued)

(51) Int. Cl.
G10L 15/00 (2013.01)
G10L 15/16 (2006.01)
G10L 15/04 (2013.01)
G10L 15/06 (2013.01)
G10L 15/22 (2006.01)
G10L 15/187 (2013.01)
G10L 15/26 (2006.01)
G10L 15/02 (2006.01)

(52) U.S. Cl.
CPC .............. *G10L 15/16* (2013.01); *G10L 15/04* (2013.01); *G10L 15/063* (2013.01); *G10L 15/22* (2013.01); *G10L 15/02* (2013.01); *G10L 15/187* (2013.01); *G10L 15/26* (2013.01)

(58) Field of Classification Search
CPC combination set(s) only.
See application file for complete search history.

(56) References Cited

U.S. PATENT DOCUMENTS 10,319,374 B2 6/2019 Catanzaro et al.
2012/0010544 A1 1/2012 Chen

OTHER PUBLICATIONS

Local Monotonic Attention Mechanism for End-to-End Speech and Language Processing, Andros Tjandra, Sakriani Sakti, Satoshi Nakamura, May 23, 2017.

*Primary Examiner* — Vu B Hang
(74) *Attorney, Agent, or Firm* — Honigman LLP; Brett A. Krueger

(57) ABSTRACT

A method includes obtaining audio data for a long-form utterance and segmenting the audio data for the long-form utterance into a plurality of overlapping segments. The method also includes, for each overlapping segment of the plurality of overlapping segments: providing features indicative of acoustic characteristics of the long-form utterance represented by the corresponding overlapping segment as input to an encoder neural network; processing an output of the encoder neural network using an attender neural network to generate a context vector; and generating word elements using the context vector and a decoder neural network. The method also includes generating a transcription for the long-form utterance by merging the word (Continued)

elements from the plurality of overlapping segments and providing the transcription as an output of the automated speech recognition system.

20 Claims, 6 Drawing Sheets

Related U.S. Application Data

(60) Provisional application No. 62/701,237, filed on Jul. 20, 2018.

SPEECH RECOGNITION WITH SEQUENCE-TO-SEQUENCE MODELS

CROSS-REFERENCE TO RELATED APPLICATIONS

This U.S. patent application is a Continuation-In-Part of, and claims priority under 35 U.S.C. § 120 from, U.S. patent application Ser. No. 16/516,390, filed on Jul. 19, 2019, which claims priority under 35 U.S.C. § 119(e) to U.S. Provisional Application 62/701,237, filed on Jul. 20, 2018. The disclosure of these prior applications are considered part of the disclosure of this application and are hereby incorporated by reference in their entireties.

TECHNICAL FIELD

The present specification is related to speech recognition.

BACKGROUND

In general, speech recognition systems can use a neural network model that performs speech enhancement and acoustic modeling. Some systems process audio data from multiple input, sources using a neural network.

SUMMARY

Various techniques for enhancing speech recognition accuracy are disclosed below. Some implementations involve enhanced listen, attend, and spell (LAS) models, and others involve neural transducer models. Both types of models can use an attention mechanism, e.g., an attention neural network between an encoder and decoder, and can achieve high accuracy in recognizing speech.

An attention-based model can be used for sequence-to-sequence speech recognition. In some implementations, the model provides end-to-end speech recognition and integrates acoustic, pronunciation, and language models into a single neural network, and does not require a lexicon or a separate text normalization component. Various structures and optimization mechanisms can provide increased accuracy and reduced model training time. Structural improvements include the use of word piece models, which can allow the model to output different types of linguistic units, from single graphemes up to whole words. Another structural improvement includes the use of multi-headed attention processing that enables multiple attention distributions to be generated for the same encoder outputs.

Attention-based encoder-decoder architectures such as Listen, Attend, and Spell (LAS), subsume the acoustic, pronunciation and language model components of a traditional automatic speech recognition (ASR) system into a single neural network. In some implementations, such architectures are comparable to state-of-the-art ASR systems on dictation tasks, but it was not clear if such architectures would be practical for more challenging tasks such as voice search. This document describes a variety of structural and optimization improvements to an LAS model which can significantly improve performance. On the structural side, it is shown that word piece models can be used instead of graphemes. This document introduces a multi-head attention architecture, which offers improvements over the commonly-used single-head attention.

One aspect of the disclosure provides a method for transcribing a long-form utterance using an automatic speech recognition system. The method includes obtaining, at data processing hardware, audio data for the long-form utterance and segmenting, by the data processing hardware, the audio data for the long-form utterance into a plurality of overlapping segments. The method also includes, for each overlapping segment of the plurality of overlapping segments, providing, by the data processing hardware, features indicative of acoustic characteristics of the long-form utterance represented by the corresponding overlapping segment as input to an encoder neural network; processing, by the data processing hardware, an output of the encoder neural network using an attender neural network to generate a context vector, and generating, by the data processing hardware, word elements using the context vector and a decoder neural network. The method also includes generating, by the data processing hardware, a transcription for the long-form utterance by merging the word elements from the plurality of overlapping segments, and providing, by the data processing hardware, the transcription as an output of the automated speech recognition system.

Implementations of the disclosure provide one or more of the following optional features. In some implementations, segmenting the audio data for the long-form utterance into the plurality of overlapping segments includes applying a 50-percent overlap between overlapping segments. In additional implementations, generating the transcription for the long-form utterance by merging the word elements from the plurality of overlapping segments includes, identifying one or more matching word elements for each overlapping pair of segments of the plurality of overlapping segments and generating the transcription for the long-form utterance based on the one or more matching word elements identified from each overlapping pair of segments.

In some examples, the method also includes, for each overlapping segment of the plurality of overlapping segments, assigning, by the data processing hardware, a confidence score to each generated word element based on a relative location of the corresponding generated word element in the corresponding overlapping segment. In these examples, assigning the confidence score to each generated word element may include assigning higher confidence scores to generated word elements located further from starting and ending boundaries of the corresponding overlapping segment. Additionally or alternatively, in these examples, generating the transcription for the long-form utterance by merging the word elements from the plurality of overlapping segments may include identifying non-matching word elements between a first overlapping segment of the plurality of overlapping segments and a subsequent second overlapping segment of the plurality of overlapping segments, and selecting the non-matching word element from for use in the transcription that is associated with a highest assigned confidence score. Here, the first overlapping segment is associated with one of an odd number or an even number and the subsequent second overlapping segment is associated with the other one of the odd number or even number.

The encoder neural network, the attender neural network, and the decoder neural network may be jointly trained on a plurality of training utterances, whereby each training utterances of the plurality of training utterances includes a duration that is shorter than a duration of the long-form utterance. The encoder neural network may include a recurrent neural network including long short-term memory (LSTM) elements. In some examples, the method also includes applying, by the data processing hardware, a monotonicity constraint to the attender neural network.

In some implementations, providing features indicative of acoustic characteristics of the long-form utterance represented by the corresponding overlapping segment as input to the encoder neural network includes providing a series of features vectors that represent a corresponding portion of the long-form utterance represented by the overlapping segment. In these implementations, generating word elements using the context vector and the decoder neural network includes beginning decoding of word elements representing the utterance after the encoder neural network has completed generating output encodings for each of the feature vectors in the series of features vectors that represent the corresponding portion of the long-form utterance represented by the overlapping segment.

Another aspect of the present disclosure provides an automated speech recognition (ASR) system for transcribing a long-form utterance. The ASR system includes data processing hardware and memory hardware. The memory hardware stores instructions that when executed by the data processing hardware cause the data processing hardware to perform operations that include obtaining audio data for the long-form utterance and segmenting the audio data for the long-form utterance into a plurality of overlapping segments. The operations also include, for each overlapping segment of the plurality of overlapping segments: providing features indicative of acoustic characteristics of the long-form utterance represented by the corresponding overlapping segment as input to an encoder neural network; processing an output of the encoder neural network using an attender neural network to generate a context vector; and generating word elements using the context vector and a decoder neural network. The operations also include generating a transcription for the long-form utterance by merging the word elements from the plurality of overlapping segments and providing the transcription as an output of the automated speech recognition system.

This aspect may include one or more of the following features. In some implementations, segmenting the audio data for the long-form utterance into the plurality of overlapping segments includes applying a 50-percent overlap between overlapping segments. In additional implementations, generating the transcription for the long-form utterance by merging the word elements from the plurality of overlapping segments includes, identifying one or more matching word elements for each overlapping pair of segments of the plurality of overlapping segments, and generating the transcription for the long-form utterance based on the one or more matching word elements identified from each overlapping pair of segments.

In some examples, the operations also include, for each overlapping segment of the plurality of overlapping segments, assigning a confidence score to each generated word element based on a relative location of the corresponding generated word element in the corresponding overlapping segment. In these examples, assigning the confidence score to each generated word element may include assigning higher confidence scores to generated word elements located further from starting and ending boundaries of the corresponding overlapping segment. Additionally or alternatively, in these examples, generating the transcription for the long-form utterance by merging the word elements from the plurality of overlapping segments may include identifying non-matching word elements between a first overlapping segment of the plurality of overlapping segments and a subsequent second overlapping segment of the plurality of overlapping segments, and selecting the non-matching word element from for use in the transcription that is associated with a highest assigned confidence score. Here, the first overlapping segment is associated with one of an odd number or an even number and the subsequent second overlapping segment is associated with the other one of the odd number or even number.

The encoder neural network, the attender neural network, and the decoder neural network may be jointly trained on a plurality of training utterances, whereby each training utterances of the plurality of training utterances includes a duration that is shorter than a duration of the long-form utterance. The encoder neural network may include a recurrent neural network including long short-term memory (LSTM) elements. In some examples, the operations also includes applying, by the data processing hardware, a monotonicity constraint to the attender neural network.

In some implementations, providing features indicative of acoustic characteristics of the long-form utterance represented by the corresponding overlapping segment as input to the encoder neural network includes providing a series of features vectors that represent a corresponding portion of the long-form utterance represented by the overlapping segment. In these implementations, generating word elements using the context vector and the decoder neural network includes beginning decoding of word elements representing the utterance after the encoder neural network has completed generating output encodings for each of the feature vectors in the series of features vectors that represent the corresponding portion of the long-form utterance represented by the overlapping segment.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

Like reference numbers and designations in the various drawings indicate like elements.

DETAILED DESCRIPTION

Sequence-to-sequence models have been gaining in popularity in the automatic speech recognition (ASR) community as a way of folding separate acoustic models, pronunciation models, and language models of a conventional ASR system into a single neural network. A variety of sequence-to-sequence models have been explored, including Recurrent Neural Network Transducer (RNN-T), Listen, Attend and Spell (LAS), Neural Transducer, Monotonic Alignments and Recurrent Neural Aligner (RNA). While these models have shown promising results, thus far, it is not clear if such approaches would be practical to unseat the current state-of-the-art, hidden Markov model (HMM)-based neural network acoustic models, which are combined with a separate pronunciation model (PM) and language model (LM) in a conventional system. Such sequence-to-sequence models are fully neural, without finite state transducers, a lexicon, or text normalization modules. Training such models is simpler than conventional ASR systems: they do not require bootstrapping from decision trees or time alignments generated from a separate system.

LAS can provide improvements over other sequence-to-sequence models, and this document describes improvements to the LAS model and the RNN-T model during inference. The LAS model is a single neural network that includes an encoder which is analogous to a conventional acoustic model, an attender that acts as an alignment model, and a decoder that is analogous to the language model in a conventional system. Modifications to both the model structure, as well as in the optimization process, are considered. On the structure side, first, word piece models (WPM) are explored which have been applied to machine translation and more recently to speech in RNN-T and LAS.

Figure 1:
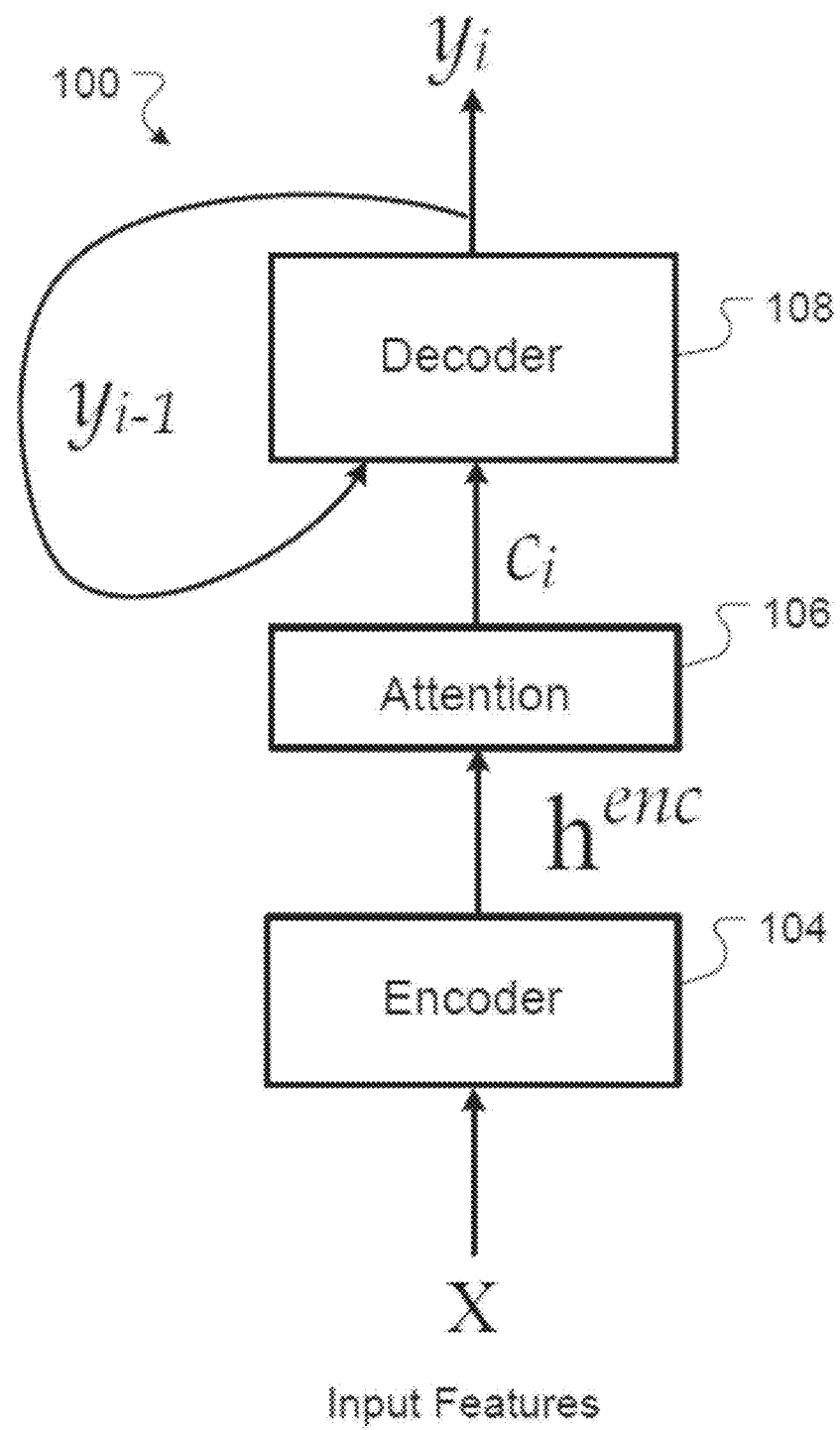
FIG. 1 is a schematic view of an example model that includes an attention-based encoder-decoder architecture for performing speech recognition.

In general, a system is described that provides structure and optimization improvements to a basic LAS model. An example LAS model 100 used for implementing the techniques described in this document includes three modules as shown in FIG. 1. The listener encoder module 104, which is similar to a standard acoustic model, takes the input features, x, and maps them to a higher-level feature representation, $h^{enc}$. This process of generating an encoded feature representation, $h^{enc}$, can be done for each of multiple input frames, representing different input time steps. These timesteps are denoted with subscript u below. Thus, for a set of frames $\{f_1, f_2, f_3, \ldots f_u\}$ there can be a corresponding set of encoded outputs $\{h_1, h_2, h_3, \ldots h_u\}$.

The output of the encoder 104 is passed to an attender 106, which determines which encoder features in $h^{enc}$ should be attended to in order to predict the next output symbol, $y_i$, similar to a dynamic time warping (DTW) alignment module. In some examples, attender 106 is referred to herein as attender neural network or attention module 106. The attender 106 can generate a context output $c_i$ for each of multiple output steps i. For each context output vector $c_i$, the attender 106 can compute attention based on the encodings for one or more input steps u, e.g., the encoding for the current input step as well as encodings for previous input steps. For example, the attender 106 can generate an attention context output $c_i$ over the set of all the encoder outputs of the utterance, e.g., the entire set $\{h_1, h_2, h_3, \ldots h_u\}$. The attention context vector can be vector representing a weighted summary of the current and previous encodings for frames (e.g., portions) of the utterance being recognized. Described in greater detail below, implementations include restricting the attention of the attender 106 to be monotonic by scanning the encoder hidden states in a left-to-right order and selecting a particular encoder state. By having a monotonicity constraint, the attender 106 exploits the observation that in ASR, a target sequence (e.g., transcript) and source sequence (acoustic signal) are monotonically aligned.

Finally, the output of the attender 106 is passed to the decoder 108, which takes the attention context (e.g., a context vector or attention distribution), $c_i$, output by the attender 106, as well as an embedding of the previous prediction, $y_i-1$, in order to produce a decoder output. The decoder output can be a probability distribution, $P(y_i|y_{i-1}, \ldots, y_0, x)$, over the current sub-word unit, $y_i$, given the previous units, $\{y_{i-1}, \ldots y_0\}$, and input, x. Although not illustrated, the model 100 may include a softmax layer that receives output of the decoder 108. In some implementations, the softmax layer is separate from the decoder 108 and processes the output, $y_i$, from the decoder 108, and the output of the softmax layer is then used in a beam search process to select orthographic elements. In some implementations, the softmax layer is integrated with the decoder 108, so that the output $y_i$ of the decoder 108 represents the output of the softmax layer.

The decoder 108 and/or an associated softmax layer may trained to output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the decoder 108 and/or the softmax layer can include a posterior probability value for each of the different output labels. Thus, if there are 100 different output labels representing different graphemes or other symbols, the output $y_i$ of the decoder or the output of a softmax layer that receives and processes the output $y_i$ can include 100 different probability values, one for each output label. The probability distribution can then be used to select and assign scores to candidate orthographic elements (e.g., graphemes, wordpieces, and/or words) in a beam search process for determining the transcription.

In general, attention can be computed using an attention-based long short-term memory (LSTM) transducer as the attender 106. At every output step, the attender 106 produces a probability distribution over the next character, conditioned on all the characters seen previously. This distribution can be a context vector ci is produced by the attender.

The output distribution $y_i$ is a function of the decoder state $s_i$ and context vector $c_i$. The decoder state $s_i$ is a function of the previous decoder state, $s_{i-1}$, the previously emitted character, $y_{i-1}$, and the previous context vector $c_{i-1}$.

At each time step, i, the attention mechanism generates a context vector, $c_i$, encapsulating the information in the acoustic signal needed to generate the next character. The attention model is content-based, so the contents of the decoder state $s_i$ are matched to the contents of $h_u$ representing time step u of h, to generate an attention vector $\alpha_i$. Then vector $\alpha_i$ is used to linearly blend vectors $h_u$ to create $c_i$.

As an example, at each decoder timestep i, the attention mechanism can compute the scalar energy $e_{i,u}$ for each time step u, using vector $h_u \in h$ and si. The scalar energy $e_{i,u}$ is converted into a probability distribution over time steps (or attention) $\alpha_i$ using a softmax function. This is used to create the context vector $c_i$ by linearly blending the listener features or encoder outputs, $h_u$, at different time steps, for example, using the equations shown below.

$$e_{i,u} = \langle \phi(s_i), \psi(h_u) \rangle \quad (1)\text{-}(3)$$

$$\alpha_{i,u} = \frac{\exp(e_{i,u})}{\sum_u \exp(e_{i,u})}$$

$$c_i = \sum_u \alpha_{i,u} h_u$$

The structural improvements to the LAS model include the use of word-piece models and multi-headed attention. Regarding word-piece models, traditionally, sequence-to-sequence models have used graphemes (characters) as output units, as this folds the acoustic model, pronunciation model, and language model into one neural network, and side-steps the problem of out-of-vocabulary words. Alternatively, one could use longer units such as word pieces or shorter units such as context-independent phonemes. One of the disadvantages of using phonemes is that it requires having an additional pronunciation model and language model, and was not found to improve over graphemes in some cases.

Typically, word-level LMs have a much lower perplexity compared to grapheme-level LMs. Thus, modeling word pieces can allow for a much stronger decoder LM compared to graphemes. In addition, modeling longer units improves the effective memory of the decoder LSTMs, and allows the model to potentially memorize pronunciations for frequently occurring words. Furthermore, longer units require fewer decoding steps, which can speed up inference in these models significantly. Finally, WPMs also show good performance for other sequence-to-sequence models such as RNN-T.

The word piece models described herein include sub-word units, ranging from graphemes all the way up to entire words. Thus, there are no out-of-vocabulary words with word piece models. The word piece models are trained to maximize the language model likelihood over the training set. In some implementations, the word pieces are "position-dependent", in that a special word separator marker is used to denote word boundaries.

Figure 2:
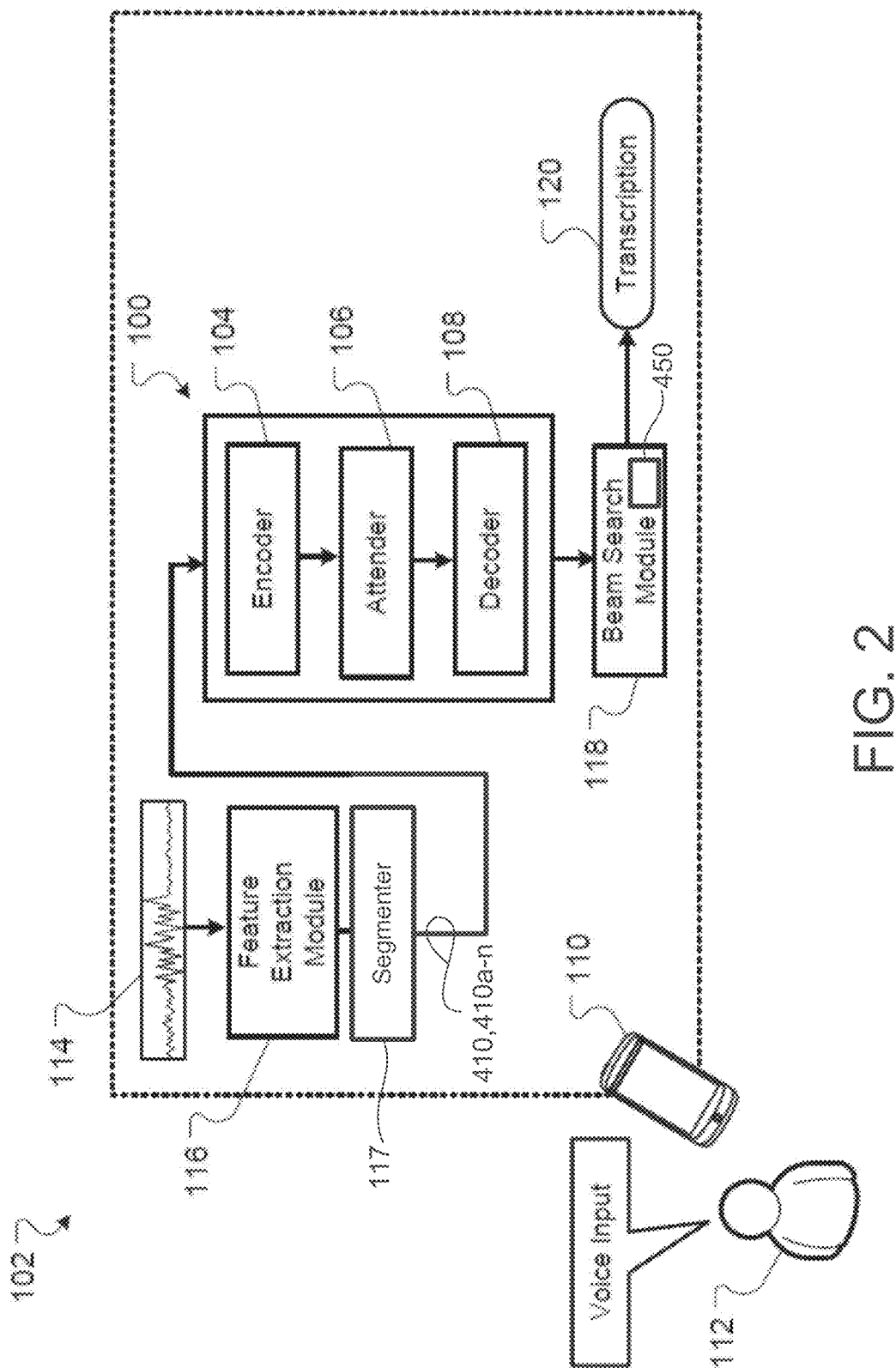
FIG. 2 is a schematic view of an example system for performing speech recognition using the example model of FIG. 1.

FIG. 2 is a diagram showing an example system 102 for performing speech recognition using the model 100 of FIG. 1 or another end-to-end model such as a RNN-T model. In some implementations, system 102 is an example automated speech recognition system. In the example of FIG. 2, the speech recognition system is implemented using a computing system, such as a user device 110, which stores and uses the improved LAS model 100 to generate a transcription 120 for a voice input. As shown at FIG. 2, an electronic device stores the modules of LAS model 100. The electronic device 110 receives an utterance from a user 112, such as a voice command. In other examples, the speech recognition system 102 resides on a remote server (e.g., distributed system) in communication with the user device 110 via a network.

The utterance may include an utterance of a particular, predetermined hotword that the electronic device 110 is configured to detect and respond to. For example, the electronic device 110 can be configured to wake from a low-power state or to interpret subsequent speech as a voice command in response to detecting utterance of the hotword. In some implementations, the LAS model 100 or another model is used to detect the occurrence of hotwords. In some implementations, a hotword can be a user-defined term or phrase that is changed dynamically based on user preference. The hotword, whether predetermined or user-defined (e.g., a custom hotword), may include one or more words/terms that when spoken, triggers the electronic device 110 to activate the LAS model 100 for generating a transcription 120 for a voice input following the hotword. The voice input may correspond to a long-form utterance such as dictating speech spoken by the user 112 or transcribing other audio such as from a movie or podcast.

The electronic device 110 has a microphone that detects the utterance from the user and generates audio data 114 representing the utterance spoken by user 112. A feature extraction module 116 processes the audio data 114 to extract (e.g., generate) a set of feature values that are indicative of acoustic characteristics of the utterance. For example, the feature values may be mel-frequency cepstral coefficients. The extracted feature values are provided as inputs to the encoder 104 of the LAS model 100 for mapping to appropriate encoded feature representations. The output of the encoder 104 is processed using the attender 106 to generate an attention distribution. The system 102 generates word element scores using the decoder 108 that receives the attention distribution as an input. The scores indicate likelihoods for a set of word elements. For example, the decoder can provide a probability distribution that indicates posterior probabilities for each of a set of word elements.

Generating the transcription 120 output for the utterance can include using beam search processing to generate one or more candidate transcriptions based on the word element scores. The system 102 also includes a beam search module 118 that performs beam search decoding to generate the candidate transcriptions from which a final transcription 120 is generated as an output of the ASR system 102.

In response to generating the transcription 120 using the LAS model 100, the electronic device 110 can perform any of various actions. For example, the electronic device 110 can analyze the transcription 120 to detect a hotword or command in the utterance received from user 112. In some implementations, the electronic device 110 determines whether one or more predetermined commands are present in the transcription 120, and when the command is identified the electronic device performs an action corresponding to the identified command. For example, the system 102 can identify and execute a particular command (e.g., activate a virtual assistant, play a song, set a timer, add an item to a list, and so on), change an operating mode of the electronic device 110, send the transcription 120 as a request or query to a server, provide search results generated using the transcription 120 as a query, display the transcription 120 of the utterance, or enter the transcription 120 into a text area of a user interface (e.g., during a dictation mode).

Figure 3:
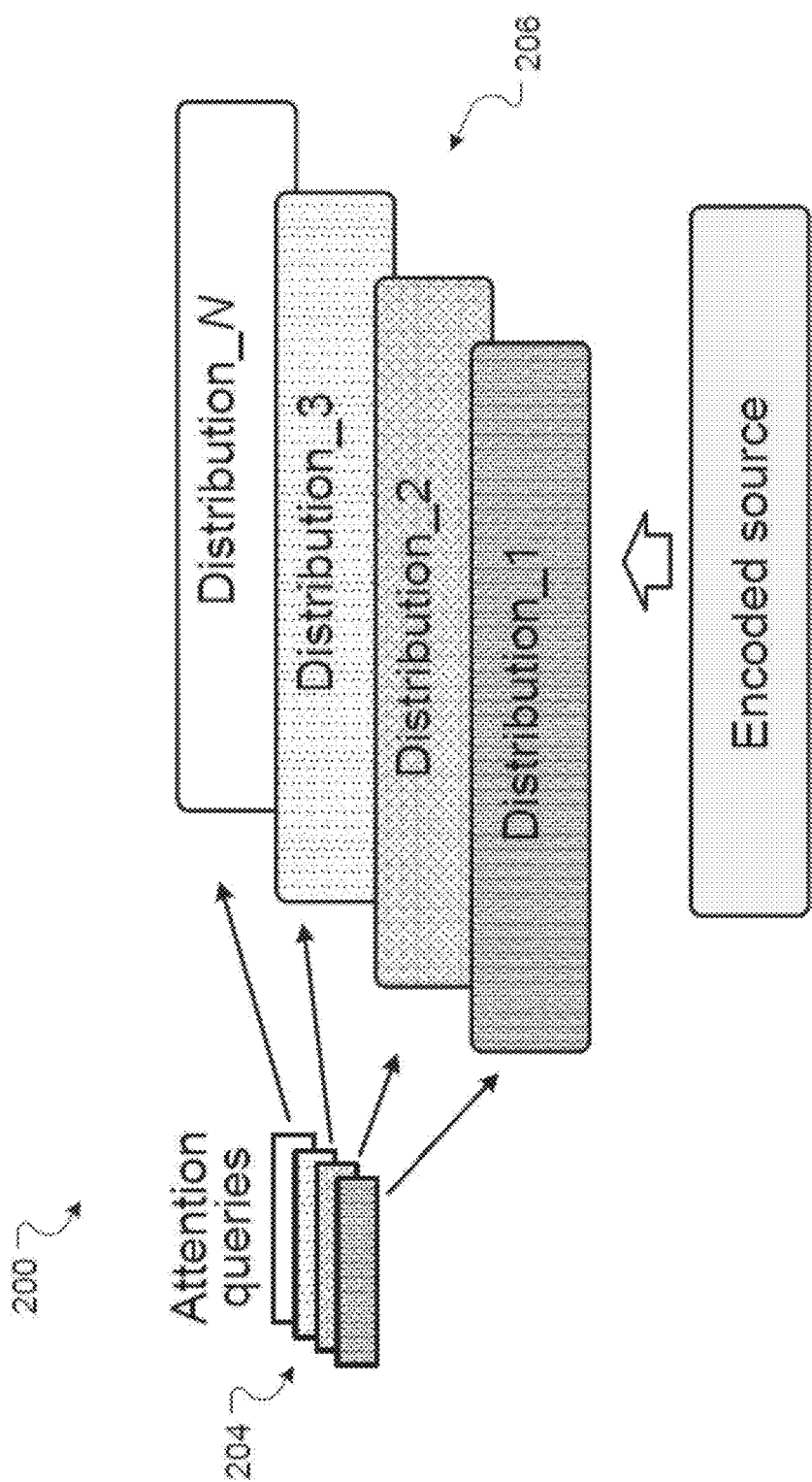
FIG. 3 is a schematic view of a multi-headed attention mechanism associated with the architecture of FIG. 1.

Regarding multi-head attention 200 ("MHA 200"), as shown in FIG. 3, MHA 200 can extend the conventional attention mechanism to have multiple heads 204, where each head can generate a different attention distribution 206. This allows each head to have a different role on attending the encoder output, which can make it easier for the decoder 108 to learn to retrieve information from the encoder 104. In some systems involving single-headed architecture, the model relies more on the encoder 104 to provide clearer signals about the utterances so that the decoder 108 can pick up the information with attention. In some implementations, MHA 200 reduces the burden on the encoder 104 and can better distinguish speech from noise when the encoded representation is less ideal, for example, in degraded acoustic conditions, such as noisy utterances, or when using uni-directional encoders.

In some implementations, the model 100 is trained on a per-video basis with a per-video specific language model and training utterances each having a duration less than 20 seconds. The training utterances are anonymized and hand-transcribed. Training data may also be assessed for 80-dimensional log-Mel features, computed with a 25 ms window and shifted every 10 ms. In some implementations, at the current frame, t, these features are stacked with 3 frames to the left and downsampled to a 30 ms frame rate. This downsamples the input sequences and reduces the overall length of frames used to represent an utterance by a factor of three. The encoder network architecture consists of 5 long short-term memory (LSTM) layers. Unidirectional and/or bidirectional LSTMs may be used to implement the encoder, where the unidirectional LSTMs have 1,400 hidden units and bidirectional LSTMs have 1,024 hidden units in each direction (2,048 per layer). Unless otherwise stated, examples are described with reference to unidirectional encoders. Additive attention is used for both single-headed and multi-headed attention examples. Multi-headed attention examples discussed below use 4 heads, although more or fewer may be used, e.g., 2, 3, 6, 8, 10 and so on. The decoder network in the examples below is a 2-layer LSTM with 1,024 hidden units per layer.

Neural networks are trained with the cross-entropy criterion and are trained using TensorFlow. In some implementations, the unidirectional LAS system has the limitation that the entire utterance must be seen by the encoder, before any labels can be decoded, although the utterance can nevertheless be encoded in a streaming fashion. To address this limitation, the described model can be revised with a streaming attention-based model, such as Neural Transducer. In addition, or as an alternative, the limitation may be addressed by training the attention-based model to operate on segments of an utterance less than the full utterance. For example, a "chunk"-based approach may process attention on small segments of the utterance, such as a certain number of frames or a certain duration of the utterance at a time. The model may shift attention from one chunk to the next to limit the amount of latency incurred. As a result, the attention mechanism can provide outputs to the decoder allowing a transcription of a first chunk or segment of an utterance while a second chunk or segment of the utterance is still being spoken.

Sequence-to-sequence models have become popular in the automatic speech recognition (ASR) community. The popularity can be associated with these models allowing for one neural network to jointly learn an acoustic, pronunciation and language model, which greatly simplifies the ASR pipeline.

Due to various constraints, training of end-to-end ASR models is often on short utterances only, thereby resulting in an inherent train and inference mismatch when the model is used to transcribe long utterances. As used herein, short-form utterances (e.g., voice queries/commands) include utterances lasting from a few seconds to a few tens of seconds at most. Long-form transcription on the other hand, is fundamental to applications like continuous transcription of long-form utterances lasting from minutes to hours, such as, without limitation, meetings, presentations, podcasts, or lecturers. Implementations herein are directed improving performance of attention-based systems, such as the LAS model 100 of FIG. 1, for recognizing long-form transcription during inference despite the models being trained on short-form utterances. Namely, two techniques to improve attention-based model performance on long-form utterances include: applying a monotonicity constraint on the attender 106 and executing an overlapping inference routine by the decoder 108 during inference.

The use of a soft-attention mechanism/model at the attender 106 is undesirable because attention context is computed based on an entire sequence of encoder hidden states, thereby fundamentally limiting a length of sequences the attender 106 can scale to. For instance, since attention computation cost is linear in the sequence length, a very long source sequence results in a computing cost for attention context that is too high for each decoding step. Moreover, long source sequences often confuse soft-based attention mechanisms/models easily, resulting in a high deletion rate.

Accordingly, to improve performance for long source sequences (e.g., long-front utterances), application of the monotonicity constraint on the attender 106 restricts the attention to be monotonic by scanning the encoder hidden states in a left-to-right order and selecting a particular encoder state. By having a monotonicity constraint (i.e., a spatial constraint), the attender 106 exploits the observation that in ASR, a target sequence (e.g., transcript) and source sequence (acoustic signal) are monotonically aligned. Therefore, by observing where the attention head was at a previous decoding step, computation of an attention context for a next decoding step cart limit focus to only a subsequence of the encoder hidden states. This observation theoretically provides a better potential to scale the attention-based model 100 to long-form utterances compared to the standard soft attention mechanism.

In some examples, the attender 106 uses a monotonic attention model that includes linear-time complexity and can be used in line settings. Details of the monotonic attention model are disclosed in Raffel, *Online and Linear-Time Attention by Enforcing Monotonic Alignments*, available at https://arxiv.org/pdf/1704.00784.pdf, the contents of which are incorporated by reference in their entirety. While the monotonic attention model provides better scalability for long sequences (acoustic signals), the monotonic attention model is limited to considering a single step of the encoder states, thereby reducing power of the attender 106. To remedy this issue, the attender 106, in other examples, incorporates a monotonic chunk-wise attention (MoChA) mechanism that allows an additional lookback window to apply soft attention. The context vector produced by the MoChA mechanism is more similar to standard soft attention which contains a weighted combination of a set of encoder states for some fixed chunk size, as opposed to the monotonic attention mechanism which only uses a single step of the encoder state. Details of the MoChA attention model are disclosed in Chiu, *Monotonic Chunkwise Attention*, available at https://arxiv.org/pdf/1712.05382.pdf, the contents of which are incorporated by reference in their entirety.

In some implementations, to further utilize the full potential of the attender 106 for applying the monotonicity constraint, the attender 106 incorporates a monotonic infinite lookback attention (MILK) mechanism to allow the attention window to look back ail the way to a beginning of a sequence. The MILK mechanism couples with a latency loss to encourage the model to make an emission decision earlier, thereby alleviating a need for the model to decide to wait until an end of a source sequence to make even a first prediction and ultimately losing the benefits of the monotonicity constraint. Accordingly, the MILK mechanism provides more flexibility and improves the modeling of long-distance reorderings and dependencies compared to the MoChA mechanism by concretely maintaining a full monotonic attention mechanism and a soft attention mechanism. Details of the MILK mechanism are disclosed in Arivazhagan, *Monotonic Infinite Lookback Attention for Simultaneous Machine Translation*, available at https://arxiv.org/pdf/1906.05218.pdf, the contents of which are incorporated by reference in their entirety. In other implementations, the attender 106 may apply the monotonicity constraint by incorporating a Gaussian Mixture Model (GMM) monotonic attention to explicitly enforce a mode of probability mass generated by current attention modules always moving incrementally to an end of the source sequence. Details of GMM monotonic attention are disclosed in Tjandra, *Local Monotonic Attention Mechanism for End-To-End Speech*

*and Language Processing*, available at https://arxiv.org/pdf/1704.08091.pdf the contents of which are incorporated by reference in their entirety.

Generally, a straightforward approach to the aforementioned mismatch between training the model on short-form utterances and using the model to transcribe long-form utterances is to break a long utterance into multiple fixed length segments and transcribing each fixed length segment independently. This straightforward approach deteriorates performance of the attention-based model because segment boundaries can cut through a middle of a word, making it impossible to recover the word from either of the adjacent segments, and recognition quality is often poor at a beginning of a segment due to lack of context. While smart segmenters that rely on voice activity detection algorithms to segment only when there is a sufficiently long silence can be used, voice activity detection (VAD) algorithms still often produce long segments in the absence of pause/silence.

To alleviate the drawbacks of breaking long utterances into fixed-length segments and/or using VAD algorithms to define segment boundaries, FIG. 2 shows the system 102 executing an overlapping inference routine 450 during inference to further improve performance for scaling to transcribing long-form utterances by breaking a long utterance into a plurality of overlapping segments 410, 410a-n. FIG. 2 shows the system 102 including a segmenter 117 for segmenting the audio data 114 for a long-form utterance (e.g., voice input) during inference into the plurality of overlapping segments 410, 410a-n, by which the feature extraction module 116 provides features indicative of acoustic characteristics of the utterance represented by each corresponding overlapping segment 410 as input to the encoder (e.g., encoder neural network) 104. In some examples, applying a 50-percent (50%) overlap between segments 410 ensures that any point of an acoustic source sequence is always covered by exactly two segments. Advantageously, the overlapping segments 410 allow recovery of any information loss at a boundary 412, 414 (FIG. 4) of a segment 410 by referencing a corresponding overlapping segment 410. Thereafter, the attender (e.g., attender neural network) 106 processes an output of the encoder 104 to generate a corresponding context vector for each overlapping segment 410, and the decoder (e.g., decoder neural network) 108 generates, for each overlapping segment 410, word elements using the context vector output from the attender 106.

In some examples, the decoder 108 generates a first candidate transcription by concatenating all odd-numbered overlapping segments 410 (e.g., first, third, fifth overlapping segments) and generates a parallel second candidate transcription by concatenating all even-numbered overlapping segments 410 (e.g., second, fourth, sixth overlapping segments). Lastly, the beam search module 118 (or the decoder 106) executes the overlapping inference routine 450 to generate the transcription 420 for the long-form utterance by merging the word elements from the plurality of overlapping segments 410. That is, the overlapping inference routine 450 searches for a best matching of word elements between the first candidate transcription and the parallel second candidate transcription. Namely, the overlapping inference routine 450 may be configured to disallow words that are more than one window (e.g., segment 410) from being matched such that the routine 450 will only match words where their segments 410 overlap. The routine 450 may align word elements from pairs of overlapping segments 410.

In some examples, the overlapping inference routine 450 assigns a confidence score to each generated word element in an overlapping segment 410 based on a relative location of the corresponding generated word element in the corresponding overlapping segment 410. During inference, end-to-end ASR models (e.g., LAS model 100) generally observe more contextual information for words further away from segment boundaries. Based on this observation, the overlapping inference routine 450 may assign the confidence score to each generated word element by assigning higher confidence scores to generated word elements located further from starting and ending boundaries 412, 414 of the corresponding overlapping segment. Accordingly, the confidence score based on the relative location of a word element in an overlapping segment 410 is defined as follows.

$$f(y_j^i, S^i, L) = -|s_j^i - (S^i + L/2)| \qquad (4)$$

where $S^i$ is a starting of the $i^{th}$ segment 410 and $S_j^i$ is a starting time of the word element j at segment i. As such, a score peaks at a center of the segment and linearly decays towards boundaries 412, 414 on both sides. For an RNN-T model, starting time $S_j^i$ is defined as a time step that the model decides to emit a word, and in scenarios when no prediction occurs, the routine 450 uses a starting time of the matched word as the starting time. For attention-based models (e.g., LAS model 100), the relative position of the word element is used to simplify Equation 4 as follows.

$$f(y_j^i, S^i, L) = -|j/C_i - 1/2| \qquad (5)$$

Wherein Ci denotes a number of matched word elements in segment i. Accordingly, a final hypotheses (e.g., transcription 120) selects word elements with higher confidence scores between non-matching word elements in overlapping segments 410.

Figure 4:
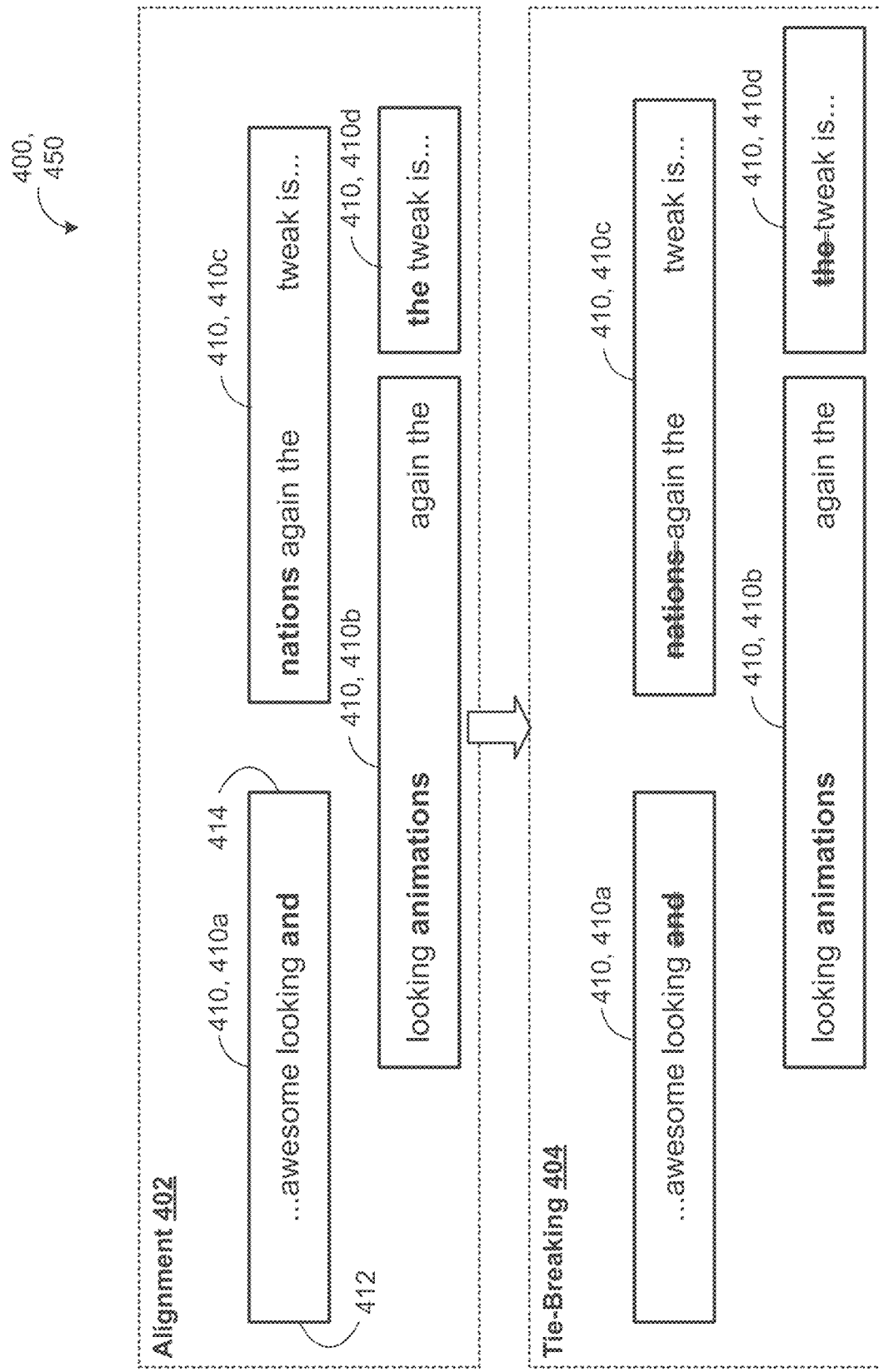
FIG. 4 is a schematic view of a plurality of overlapping segments each including corresponding word elements generated by a decoder from features indicative of acoustic characteristics of a long-form utterance.

FIG. 4 provides a schematic view 400 of a plurality of overlapping segments 410, 410a-d each including corresponding word elements generated by the decoder 108 from features indicative of acoustic characteristics of a long-form utterance represented by the corresponding segment 410. Each segment 410 includes a corresponding starting boundary 412 and a corresponding end boundary 414. In the example shown, odd number first and third segments 410a, 410c are non-overlapping segments and the concatenation between the first and third segments 410a, 410c provides at least a portion of a first candidate transcription for the long-form utterance. Similarly, even number second and fourth segments 410b, 410d are also non-overlapping segments and the concatenation between the second and fourth segments 410b, 410d provides at least a portion of a second candidate transcription for the long-form utterance. The first and second candidate transcriptions may be parallel to one another. Accordingly, the first segment 410a and the second segment 410b correspond to a respective pair of overlapping segments, the second segment 410b and the third segment 410c correspond to a respective pair of overlapping segments, and the third segment 410c and the fourth segment 410d correspond to respective pair of overlapping segments. The overlapping inference routine 450 may assign the confidence score to each word element in each segment 410a, 410b, 410c, 410d based on the relative location of the corresponding word element in the corresponding segment 410 by using Equation (4) or Equation (5).

Each overlapping segment 410 may include a fixed-length and the routine 450 may apply a 50-percent (50%) overlap between segments to ensure that any point of an acoustic source sequence is always covered by exactly two segments. However, in other examples, the routine 450 may adjust the ratio of overlap between segments such that the amount of overlap applied can be less than 50-percent or greater than 50-percent.

During an alignment phase 402, the overlapping inference routine 450 aligns the word elements to identifying matching word elements between each respective pair of overlapping segments. In the example shown, the word element "looking" is identified as a matching word element present in each of the first and second overlapping segments 410a, 410b, the word elements "again" and "the" are identified as matching word elements present in each of the second and third overlapping segments 410b, 410c, and the word elements "tweak" and "is" are identified as matching word elements present in each of the third and fourth overlapping segments 410c, 410d. However, the word elements "and" and "animations" are identified as non-matching word elements between the respective pair of overlapping segments 410a, 410b, the word elements "animations" and "nations" are identified as non-matching word elements between the respective pair of overlapping segments 410b, 410c, and the word element "the" is identified as a non-matching word element because it is present in the fourth segment 410d but not in the corresponding overlapping third segment 410c.

During a tie-breaking phase 405, the overlapping inference routine 450 selects the non-matching word element for use in the transcription 420 that is associated with a highest assigned confidence score. For instance, since the word element "animations" is located further from the boundaries 412, 414 of the second segment 410b compared to the location of the word element "and" which is close to the end boundary 414 of the overlapping first segment 410a and the location of the word element "nations" which close to the start boundary 412 of the overlapping third segment 410c, the word element "animations" is associated with a higher assigned confidence score than the confidence scores assigned to the words "and" and "nations". Accordingly, the overlapping inference routine 450 selects "animations" for use in the transcription 420 and omits the words "and" and "nations."

Generating the transcription 120 output for the utterance can include using beam search processing to generate one or more candidate transcriptions based on the word element scores. In some examples, the decoder 108 generates a first candidate transcription associated with all odd-numbered overlapping segments 410 (e.g., first, third, fifth overlapping segments) and a second candidate transcription associated with all even-numbered overlapping segments 410 (e.g., second, fourth, sixth overlapping segments). The system 102 also includes a beam search module 118 that performs beam search decoding to generate the candidate transcriptions from which a final transcription 120 is generated as an output of the ASR system 102. In some implementations, the beam search module 118 executes the overlapping inference routine 450 to generate the transcription for the long-form utterance by merging the word elements from the plurality of overlapping segments 410.

While the overlapping inference routine 450 is described with reference to the LAS model 100, the overlapping inference routine 450 can similarly be applied to RNN-T models during inference for transcribing long-form utterances. In such a configuration, the attender neural network 106 is omitted. In some examples, the RNN-T model uses the same encoder 104 as the LAS model 100 and includes five (5) layers of bi-directional LSTMs with 1024 dimension (i.e., 512 in each direction). In these examples, the RNN-T model may include a prediction network having two (2) LSTM layers with 2,048 hidden units and a 640-dimensional projection per layer, and an output network having 640 hidden units and a softmax layer may have 76 units for predicting graphemes. Details of the RNN-T model are described in He, *Streaming End-To-End Speech Recognition For Mobile Devices*, available at https://arxiv.org/pdf/1811.06621.pdf, the contents of which are incorporated by reference in their entirety.

Similar to monotonic attention-based models, RNN-T models are capable of scanning encoder states sequentially to select a particular encoder state as a next context vector, thereby enabling RNN-T models to scale well to long-form utterances despite being trained on short-form utterances. While RNN-T models and attention-based models both make a "predict" or "no-predict" decision at decoding time given a new encoder state, the two models differ in how the "predict" or "no-predict" decision affects the respective decoder's token prediction. For instance, the decoder of monotonic attention-based models uses the encoder state as attention context to make a token prediction when making a "predict" decision, but takes no action and waits for a next encoder state when making a "no-predict" decision. On the other hand, RNN-T models apply a "no-predict" decision as one of the output tokens such that RNN-T "predict" or "no-predict" decisions effectively occur at the output level. Moreover, during training, RNN_T models compute a sum of probabilities over all valid combination of "predict" or "no-predict" choices with an efficient dynamic programming language, while training monotonic attention-based models requires computing expected attention probabilities over a source sequence in order to avoid backpropagation through discrete "predict" or "no-predict" choices.

Figure 5:
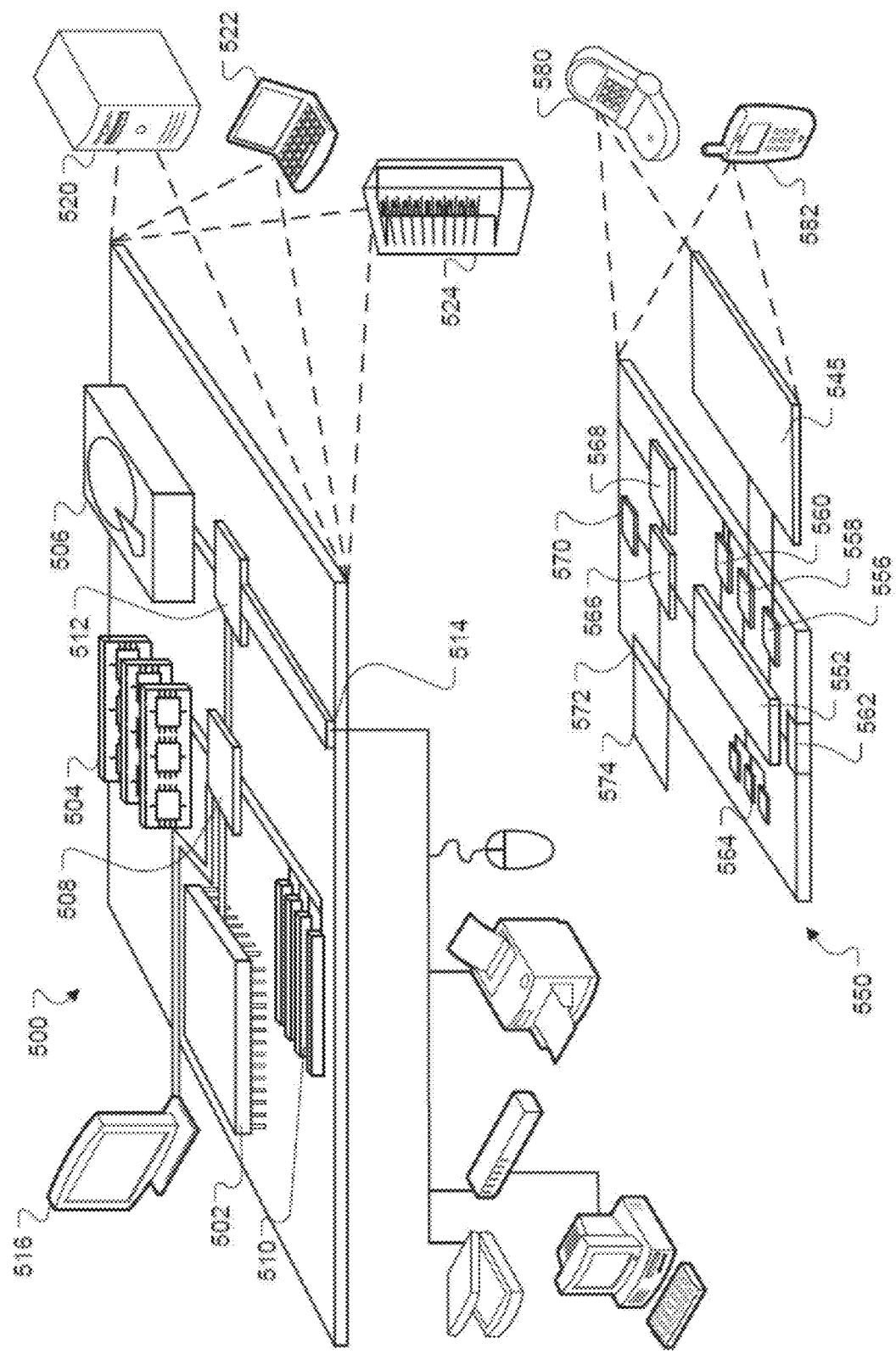
FIG. 5 is a block diagram of a computing system that can be used in connection with methods described herein.

FIG. 5 is a block, diagram of computing devices 500, 550 and systems and methods described in this document may be used to implement these devices, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 500 includes a processor 502 (e.g., data processing hardware), memory 504 (e.g., memory hardware), a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations, e.g., as a server bank, a group of blade servers, or a multi-processor system.

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516, e.g., through a graphics processor or accelerator, and to high-speed expansion ports 510, which may accept various expansion cards (not shown). In the implementation, low-speed controller 512 is coupled to storage device 506 and low-speed expansion port 514. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552 (e.g., data processing hardware), memory 564 (e.g., memory hardware), an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication, e.g., via a docking procedure, or for wireless communication, e.g., via Bluetooth or other such technologies.

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface.

Such expansion memory 574 may provide extra storage space for device 550, or may also store applications or other information for device 550. For example, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound, e.g., voice messages, music files, etc., and may also include sound generated by applications operating on device 550. The computing device 550 may be implemented in a number of different forms, as shown in the figure. For example, it may be implemented as a cellular telephone 580. It may also be implemented as part of a smartphone 582, personal digital assistant, or other similar mobile device.

Figure 6:
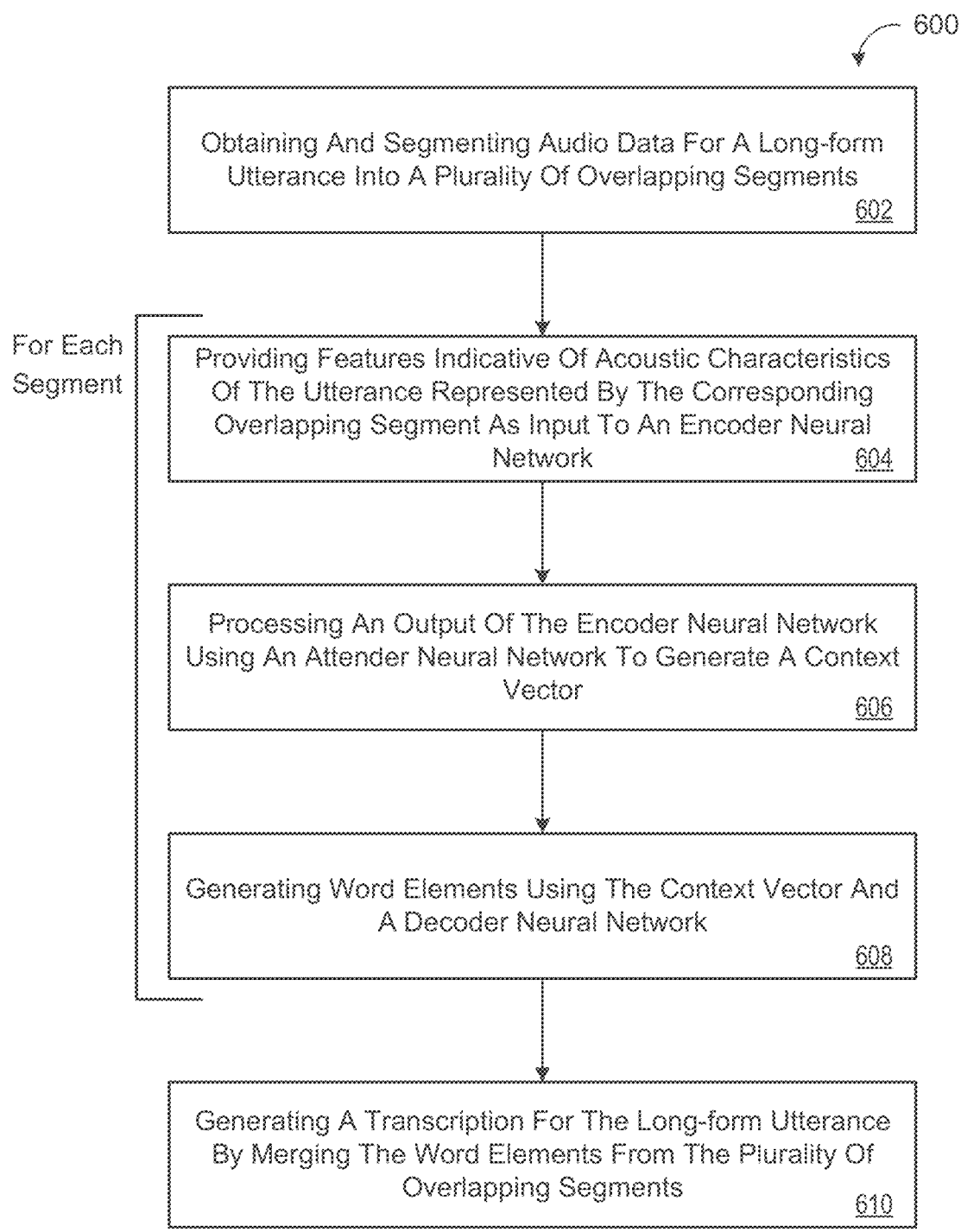
FIG. 6 is a flowchart of an example arrangement of operations for transcribing a long-form utterance using an automated speech recognition system.

FIG. 6 is a flowchart of an example arrangement of operations for a method 600 of transcribing long-form utterances using an automated speech recognition (ASR) system 102 trained on short-form utterances. At operation 602, the method includes obtaining, at data processing hardware 502, 552, audio data 114 for the long-form utterance and segmenting the audio data 114 for the long-form utterance into a plurality of overlapping segments 410, 410a-n. For each overlapping segment 410 of the plurality of overlapping segments, the method 600 includes providing, by the data processing hardware 502, 552 at operation 604, features indicative of acoustic characteristics (i.e., output by the feature extraction module 116) of the utterance represented by the corresponding overlapping segment as input to an encoder neural network 104, processing, by the data processing hardware 502, 552 at operation 606, an output of the encoder neural network 104 using an attender neural network 106 to generate a context vector, and generating, by the data processing hardware 502, 552 at operation 608, word elements using the context vector and a decoder neural network 108. At operation 610, the method also includes generating, by the data processing hardware 502, 552, a transcription 120 for the long-form utterance by merging the word elements from the plurality of overlapping segments. Thereafter, the method 600 includes providing, by the data processing hardware 502, 552, the transcription 120 as an output of the automated speech recognition system 102.

Various implementations of the method, systems, and techniques described herein can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well, for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component such as an application server, or that includes a front end component such as a client computer having a graphical user interface or a Web browser through which a user can interact with an implementation of the systems and techniques described here, or any combination of such back end, middleware, or front end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other. A number of embodiments have been described. Nevertheless, it will be understood that various modifications may be made without departing from the spirit and scope of the invention. For example, various forms of the flows shown above may be used, with steps re-ordered, added, or removed. Accordingly, other embodiments are within the scope of the following claims.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for transcribing a long-form utterance using an automatic speech recognition system, the method comprising:
   obtaining, at data processing hardware, audio data for the long-form utterance;
   segmenting, by the data processing hardware, the audio data for the long-form utterance into a plurality of overlapping segments;
   for each overlapping segment of the plurality of overlapping segments:

providing, by the data processing hardware, features indicative of acoustic characteristics of the long-form utterance represented by the corresponding overlapping segment as input to an encoder neural network;
processing, by the data processing hardware, an output of the encoder neural network using an attender neural network to generate a context vector; and
generating, by the data processing hardware, word elements using the context vector and a decoder neural network;
generating, by the data processing hardware, a transcription for the long-form utterance by merging the word elements from the plurality of overlapping segments; and
providing, by the data processing hardware, the transcription as an output of the automated speech recognition system.

2. The method of claim 1, wherein segmenting the audio data for the long-form utterance into the plurality of overlapping segments comprises applying a 50-percent overlap between overlapping segments.

3. The method of claim 1, wherein generating the transcription for the long-form utterance by merging the word elements from the plurality of overlapping segments comprises:
for each overlapping pair of segments of the plurality of overlapping segments, identifying one or more matching word elements; and
generating the transcription for the long-form utterance based on the one or more matching word elements identified from each overlapping pair of segments.

4. The method of claim 1, further comprising, for each overlapping segment of the plurality of overlapping segments, assigning, by the data processing hardware, a confidence score to each generated word element based on a relative location of the corresponding generated word element in the corresponding overlapping segment.

5. The method of claim 4, wherein assigning the confidence score to each generated word element comprises assigning higher confidence scores to generated word elements located further from starting and ending boundaries of the corresponding overlapping segment.

6. The method of claim 4, wherein generating the transcription for the long-form utterance by merging the word elements from the plurality of overlapping segments comprises:
identifying non-matching word elements between a first overlapping segment of the plurality of overlapping segments and a subsequent second overlapping segment of the plurality of overlapping segments, the first overlapping segment associated with one of an odd number or an even number and the subsequent second overlapping segment associated with the other one of the odd number or even number; and
selecting the non-matching word element from for use in the transcription that is associated with a highest assigned confidence score.

7. The method of claim 1, wherein the encoder neural network, the attender neural network, and the decoder neural network are jointly trained on a plurality of training utterances, each training utterances of the plurality of training utterances comprising a duration that is shorter than a duration of the long-form utterance.

8. The method of claim 1, wherein the encoder neural network comprises a recurrent neural network including long short-term memory (LSTM) elements.

9. The method of claim 1, further comprising applying, by the data processing hardware, a monotonicity constraint to the attender neural network.

10. The method of claim 1, wherein:
providing features indicative of acoustic characteristics of the long-form utterance represented by the corresponding overlapping segment as input to the encoder neural network comprises providing a series of features vectors that represent a corresponding portion of the long-form utterance represented by the overlapping segment; and
generating word elements using the context vector and the decoder neural network comprises beginning decoding of word elements representing the utterance after the encoder neural network has completed generating output encodings for each of the feature vectors in the series of features vectors that represent the corresponding portion of the long-form utterance represented by the overlapping segment.

11. An automated speech recognition (ASR) system for transcribing a long-form utterance, the ASR system comprising:
data processing hardware; and
memory hardware in communication with the data processing hardware and storing instructions that when executed by the data processing hardware cause the data processing hardware to perform operations comprising:
obtaining audio data for the long-form utterance;
segmenting the audio data for the long-form utterance into a plurality of overlapping segments;
for each overlapping segment of the plurality of overlapping segments:
providing features indicative of acoustic characteristics of the long-form utterance represented by the corresponding overlapping segment as input to an encoder neural network;
processing an output of the encoder neural network using an attender neural network to generate a context vector; and
generating word elements using the context vector and a decoder neural network;
generating a transcription for the long-form utterance by merging the word elements from the plurality of overlapping segments; and
providing the transcription as an output of the automated speech recognition system.

12. The ASR system of claim 11, wherein segmenting the audio data for the long-form utterance into the plurality of overlapping segments comprises applying a 50-percent overlap between overlapping segments.

13. The ASR system of claim 11, wherein generating the transcription for the long-form utterance by merging the word elements from the plurality of overlapping segments comprises:
for each overlapping pair of segments of the plurality of overlapping segments, identifying one or more matching word elements; and
generating the transcription for the long-form utterance based on the one or more matching word elements identified from each overlapping pair of segments.

14. The ASR system of claim 11, wherein the operations further comprise, for each overlapping segment of the plurality of overlapping segments, assigning a confidence score to each generated word element based on a relative location of the corresponding generated word element in the corresponding overlapping segment.

15. The ASR system of claim 14, wherein assigning the confidence score to each generated word element comprises assigning higher confidence scores to generated word elements located further from starting and ending boundaries of the corresponding overlapping segment.

16. The ASR system of claim 14, wherein generating the transcription for the long-form utterance by merging the word elements from the plurality of overlapping segments comprises:
- identifying non-matching word elements between a first overlapping segment of the plurality of overlapping segments and a subsequent second overlapping segment of the plurality of overlapping segments, the first overlapping segment associated with one of an odd number or an even number and the subsequent second overlapping segment associated with the other one of the odd number or even number; and
- selecting the non-matching word element for use in the transcription that is associated with a highest assigned confidence score.

17. The ASR system of claim 11, wherein the encoder neural network, the attender neural network, and the decoder neural network are jointly trained on a plurality of training utterances, each training utterances of the plurality of training utterances comprising a duration that is shorter than a duration of the long-form utterance.

18. The ASR system of claim 11, wherein the encoder neural network comprises a recurrent neural network including long short-term memory (LSTM) elements.

19. The ASR system of claim 11, wherein the operations further comprise applying a monotonicity constraint to the attender neural network.

20. The ASR system of claim 1, wherein:
- providing features indicative of acoustic characteristics of the long-form utterance represented by the corresponding overlapping segment as input to the encoder neural network comprises providing a series of features vectors that represent a corresponding portion of the long-form utterance represented by the overlapping segment; and
- generating word elements using the context vector and the decoder neural network comprises beginning decoding of word elements representing the utterance after the encoder neural network has completed generating output encodings for each of the feature vectors in the series of features vectors that represent the corresponding portion of the long-form utterance represented by the overlapping segment.

* * * * *